United States Patent
Haimerl (10) Patent No.: US 7,127,833 B2
(45) Date of Patent: Oct. 31, 2006

(54) SHOE UPPER AND FOOTWEAR CONSTRUCTED THEREWITH AND PROCESS FOR ITS PRODUCTION

(75) Inventor: Franz Haimerl, Starnberg (DE)

(73) Assignee: Gore Enterprise Holdings, Inc., Newark, DE (US)

( * ) Notice: Subject to any disclaimer, the term of this patent is extended or adjusted under 35 U.S.C. 154(b) by 88 days.

(21) Appl. No.: 10/504,791

(22) PCT Filed: Feb. 21, 2003

(86) PCT No.: PCT/EP03/01811

§ 371 (c)(1),
(2), (4) Date: Feb. 15, 2005

(87) PCT Pub. No.: WO03/070041

PCT Pub. Date: Aug. 28, 2003

(65) Prior Publication Data

US 2005/0138845 A1    Jun. 30, 2005

(30) Foreign Application Priority Data

Feb. 22, 2002   (DE) .................... 102 07 663

(51) Int. Cl.
A43C 13/08      (2006.01)
A43B 23/07      (2006.01)
(52) U.S. Cl. ............... 36/14; 36/55; 36/21; 12/142 E; 12/142 T
(58) Field of Classification Search ............ 36/14, 36/21, 12, 55; 12/142 E, 142 T
See application file for complete search history.

(56) References Cited

U.S. PATENT DOCUMENTS

| 3,953,566 A | 4/1976 | Gore ...................... 264/288 |
| 4,187,390 A | 2/1980 | Gore ...................... 174/102 |
| 4,194,041 A | 3/1980 | Gore et al. ............... 428/315 |
| 4,493,870 A | 1/1985 | Vrouenraets et al. ....... 428/245 |
| 4,725,418 A | 2/1988 | Friemmel et al. .......... 423/305 |
| 4,899,465 A | 2/1990 | Bleimhofer et al. ........ 36/14 |
| 5,285,546 A * | 2/1994 | Haimerl .................. 12/142 E |
| 5,329,807 A | 7/1994 | Sugar et al. .............. 73/40 |
| 5,433,021 A | 7/1995 | Mahler ................... 36/12 |
| 6,035,555 A | 3/2000 | Pavelescu et al. ......... 36/14 |
| 6,604,302 B1 * | 8/2003 | Polegato Moretti ......... 36/55 |
| 6,845,572 B1 * | 1/2005 | Haimerl et al. ............ 36/12 |
| 7,010,868 B1 * | 3/2006 | Haimerl et al. ............ 36/12 |

FOREIGN PATENT DOCUMENTS

| DE | 195 03 405 | 7/1996 |
| DE | 199 38 139 | 4/2001 |
| DE | 100 03 677 | 8/2001 |

OTHER PUBLICATIONS

PCT Written Opinion: International Application No. PCT/EP03/01811, dated Nov. 27, 2003.
PCT Supplemental Written Opinion: International Application No. PCT/EP03/01811, dated May 26, 2004.

* cited by examiner

*Primary Examiner*—Ted Kavanaugh
(74) *Attorney, Agent, or Firm*—Kevin J. Boland

(57) ABSTRACT

A shoe upper, having an upper outer material (13) with a lower outer material end region (19) located in a lower upper end region, an upper lining material, which is arranged on the inner side of the upper outer material (13), incorporates a waterproof functional layer and has a lower lining material end region (21), the lining material end region (21) having a lining edge that is not covered by the upper outer material (13), and a connecting band (17), which extends in the peripheral direction of the upper end region and is joined on a first longitudinal side (23) to the outer material end region (19) but not to the end region (21) of the lining material, and is joined on a second longitudinal side to the end region (21) of the lining material but not to the end region (19) of the outer material, wherein at points of curvature of the lower periphery of the upper end region the connecting band (17) extends in an arc corresponding to the local radius of curvature, with the two longitudinal sides of the connecting band having different degrees of curvature, , in such a way that, for an arc sector lying in the respective curvature, with a predetermined unitary sector angle, the arc lengths of the two longitudinal sides of the connecting band sides belonging to this arc sector differ from each other the more the greater the curvature of the respective arc sector is, the arc length of the first longitudinal side of the connecting band being longer than the arc length of the second longitudinal side of the connecting band at points with convex curvature of the lower periphery of the upper end region, corresponding to the different curvatures and arc lengths of the outer material end region and the lining material end region.

63 Claims, 6 Drawing Sheets

SHOE UPPER AND FOOTWEAR CONSTRUCTED THEREWITH AND PROCESS FOR ITS PRODUCTION

This application is a 371 of PCT/Ep03/01811 filed on Feb. 21, 3003.

FIELD OF THE INVENTION

The invention relates to a shoe upper and to footwear constructed therewith, the upper being provided with a waterproof and preferably also water-vapor-permeable functional layer to achieve waterproofness, and the sole region of the footwear being additionally sealed, and also to a process for producing such an upper and such footwear.

BACKGROUND OF THE INVENTION

An example of footwear of this type is shown by the applicant's EP 0 298 360 B1, an upper outer material being lined with an upper lining material having a waterproof functional layer. The upper outer material is cut shorter on the sole sided end than the upper lining material, so that an overhang of the upper lining material beyond the upper outer material is obtained. The overhang is bridged by a net band, one longitudinal side of which is sewn to the sole sided end of the upper outer material, but not to the upper lining material, and the other longitudinal side of which is sewn to the sole sided end of the upper lining material but not to the upper outer material. The net band, preferably comprising monofilament fibers, interrupts a water bridge for water passing from the upper outer material that has become wet to the sole region. If the sole sided edge of the upper outer material were to reach down as far as the sole sided edge of the upper lining material, water creeping down the upper could reach the sole sided edge of the functional layer and from there get to the inside of the lining, which could lead to the inside of the shoe becoming wet. This footwear is provided with a molded-on outsole, having such a height at the lower end of the upper that it embeds the net band and the seam connecting it to the upper outer material. The net band has pores dimensioned such that the outsole material, which is liquid when it is being molded, can penetrate through the net band and force its way to the overhang of the upper lining material and thereby seal the part of the functional layer that is located in the region of the overhang. To maintain the breathability of this footwear, its functional layer is not only waterproof but also water-vapor-permeable. This known construction has proven to be very successful for the production of footwear which is not only breathable but also extremely and reliably waterproof.

Footwear with a similar net band solution is shown by the applicant's DE 199 38 139 A1, in which however the region of the functional layer that is bridged by the net band is not sealed by means of outsole material, but by means of a reactive hot-melt adhesive which is applied in the non-reacted state to the outer side of the net band and leads to waterproofness in the fully reacted state.

One of the problems with these solutions is that the upper has a tendency to become folded and distorted in the region of the net band, in particular at those points at which the sole contour of the footwear has a narrow radius of curvature, such as in particular in the region of the toes and heel, which applies most particularly to children's shoes. If the net band extends with its transverse dimension approximately perpendicularly in relation to the outsole, formation of folds occurs, because upper end region the lower upper end region does not rise up perpendicularly from the outsole at most points of its periphery, but with an inclination, which applies in particular to the toe region of shoes with a soft outer material. If the net band is located in a part of the lower upper end region that is turned back parallel to the outsole, formation of folds occurs due to different degrees of curvature of the edges of the outer material end region and the lining material end region.

In the case of footwear known from DE 195 03 405 C1, it has been attempted to counter the problem of formation of folds by using the same technique as in the previously considered examples of known footwear, in that the lower end of the outer material is joined to the insole by means of a net band, but with a lining laminate incorporating the functional layer ending at a distance from the insole just like the outer material and being joined to the latter only by means of outsole material, with the result that, before the outsole is molded on, the lower end of the lining laminate can flap freely, which makes shoe production more difficult, and this sole construction is suitable only for shoes with a molded-on outsole.

The object of the invention is to remedy this and to avoid formation of folds, even if the lower end of the functional layer extends as far as the net band edge remote from the upper outer material.

To achieve this object, the invention provides a shoe upper of the type specified in claim 1 and footwear of the type specified in claim 25. The invention also provides a process for producing a shoe upper of the type specified in claim 36 and a process for producing footwear of the type specified in claim 55. With regard to developments, reference is made to the dependent claims.

A shoe upper according to the invention comprises an upper outer material with a lower outer material end region located in a lower upper end region, an upper lining material, which is arranged on the inner side of the upper outer material, incorporates a waterproof functional layer and has a lower lining material end region, the lining material end region having a lining edge that is not covered by the upper outer material, and a connecting band, which extends around the periphery of the upper end region and is joined on a first longitudinal side to the outer material end region but not to the lining material end region, and is joined on a second longitudinal side to the lining material end region but not to the outer material end region, wherein at points of curvature of the lower periphery of the upper end region the connecting band extends in an arc corresponding to the local radius of curvature, with the two longitudinal sides of the connecting band having different degrees of curvature, in such a way that, for an arc sector lying in the respective curvature, with a predetermined unitary sector angle, the arc lengths of the two longitudinal connecting band sides belonging to this arc sector differ from each other the more, the greater the curvature of the respective arc sector is, the arc length of the first longitudinal side of the connecting band being longer than the arc length of the second longitudinal side of the connecting band at points with convex curvature of the lower periphery of the upper end region, corresponding to the differing curvatures and arc lengths of the outer material end and the lining material end region.

For the purpose of this invention, convex and concave mean that the peripheral contour of the lower upper end region corresponding to the peripheral contour of the sole, that is to be attached at a later stage, is pre-curved outward or drawn-in inward, viewed from the middle of the later sole surface.

The terms arc sector, arc lengths and unitary sector angle are explained in more detail at a later point with the aid of FIG. 12.

Footwear according to the invention comprises a shoe upper of this type and a sealing material which seals the lining material end region in a waterproof manner in a sealing material zone that is located in the region of the connecting band and extends in the peripheral direction of the upper end region.

In the case of known footwear of the type mentioned at the beginning, formation of folds of the upper has been caused in the region of the net band because it has not been taken into account that the curved edge of the outer material end region and the curved edge of the lining material end region have different arc lengths at points at which the lower periphery of the upper end region has a curvature, which applies in particular in the region of the toes and in the region of the heel, the difference in arc length depending on the degree of local curvature. If, as was the case up to now, use is made of a net band which is not adapted, or is not adaptable, to the different curvatures of the periphery of the upper end region, fold-like distortions inevitably occur due to the different curvatures and curvature arc lengths on the two longitudinal sides of the net band, and these distortions can also be transferred to the material that is sewn onto the net band, in particular the lining material, which is generally softer than the outer material. Such formation of folds of the net band may have the effect that sealing material which is intended to penetrate through the net band as far as the functional layer of the lining no longer forces its way adequately or adequately uniformly through to the functional layer at the points of the folds, and sealing of the region of the functional layer adjacent to the net band is no longer achieved in a satisfactory way. Folds in the lining material and/or in the outer material require thicker layers of adhesive for the cement-lasting in the case of a lasted upper and/or for the cementing on of an outsole, and consequently a higher sole construction than would be required without the folds. This also applies to molded-on outsoles, the sole side edge of which must be molded higher up in the case of formation of folds formation.

It has already been attempted to reduce the problem of formation of folds by using a conical net band whose upper longitudinal side net band forms a circle with a smaller diameter than the lower longitudinal side when the band is bent to form a circle. A net band of this type, which is produced by a weaving operation and is relatively rigid, is on the one hand complex to produce and on the other hand can only be adapted to a quite specific curvature of the upper end region periphery. At points of different curvature, the problem of formation of folds remains, however, and at points at which the direction of curvature is opposed to that for which the conical net band is designed, the problem of formation of folds is intensified in comparison to a neutral net band of a conventional type. Normally, the conical net band is designed for curvatures in the region of the toes or heel of the shoe. However, on the inner side of the middle region of the foot, the shoe usually has an opposed direction of curvature. There, the conical net band exacerbates the problems instead of reducing them.

This is avoided in the case of footwear with an upper according to the invention by the use of a connecting band which is adapted or adaptable to different curvatures along the periphery of the upper end region. Connecting band adapted to different curvatures is provided at the time of production with a curvature that is adapted to a specific shoe model, in that it is for example punched out or injection-molded with a suitable shape of curvature. An elastically or plastically expandable band is suitable as an adaptable connecting band, the adaptation to different curvatures being achievable by choosing a longitudinal tensile pre-stress during connection to the lining material end region and/or the outer material end region.

An elastically expandable connecting band is particularly preferred, because it is adaptable to the different curvature conditions particularly easily and without being designed for a specific shoe model.

In order to obtain the desired effect, that is the avoidance of formation of folds, the longitudinal side of the elastic connecting band that is joined to the lining material end region must be elastically expandable and joined to the lining material end region subjected to longitudinal tensile pre-stress. The longitudinal side of the elastic connecting band that is joined to the upper outer material end region does not have to be, but may be, elastically expandable and does not have to be, but may be, joined to the upper outer material end region subjected to longitudinal tensile pre-stress. If both longitudinal sides of the elastic connecting band are joined subjected to longitudinal tensile pre-stress, it is recommendable, but not absolutely necessary, to subject the longitudinal side that is joined to the lining material end region to the same longitudinal tensile pre-stress as the longitudinal side that is joined to the upper outer material end region.

The fact that this elastic connecting band is joined to the upper lining material while being subjected to longitudinal tensile pre-stress on the longitudinal side that is joined to the upper lining material and attempts to contract back into its non-extended state means that the longitudinal side of the elastic connecting band that is to be joined to the upper lining material is shortened in comparison with the other longitudinal side, thereby preventing formation of folds.

It is advantageous to subject the elastic connecting band to a longitudinal tensile pre-stress also as it is being sewn onto the upper outer material. This achieves the effect that the elastic connecting band on the longitudinal side that is joined to the lining material contracts particularly intensively during bending and, as a result, formation of folds is prevented particularly well. After sewing the connecting band subjected to longitudinal tensile pre-stress onto the upper outer material, it is also easier to sew the lining material securely to the connecting band subjected to longitudinal tensile pre-stress, since the upper outer material with the elastic connecting band subjected to longitudinal tensile pre-stress sewn onto it contracts, and consequently the sewing of the lining material onto the connecting band without renewed exertion of a longitudinal tensile pre-stress may involve difficulties, in particular if the lining material and the outer material cannot extend to the same degree in the peripheral direction of the upper end region.

When the upper is being stretched onto a last, the elastic connecting band makes it possible in a very simple way for the connecting band to be pulled under the sole sided edge of the last. Due to the longitudinal tensile pre-stress, the elastic connecting band flips into a position parallel to the outsole to be applied later, which may facilitate subsequent processing steps. The connecting band remains free of folds, which is important in particular in the case of shoes with a narrow radius of curvature of the peripheral contour of the sole, most particularly in the case of pointed shoes and small shoes, for example children's shoes and smaller ladies' sizes. The fact that there are no longer any folds means that, when the connecting band is formed as a net band, the subsequently applied sealing material can penetrate well through the net band at all points, so that a particularly high-quality and durable waterproofness of the finished footwear is obtained. Since folds no longer occur, thinner soles can be used. This has a particularly positive effect in the case of shoes in which the lower upper end region including the connecting band is turned back around the lower edge of the last and remains in this position, and the outsole does not need to have a edge rising up to the upper in order to cover a connecting band, which extends with its transverse dimension approximately perpendicularly in relation to the outsole. As the connecting band disappears under the lower edge of the last without any problem and free from folds, it is no longer necessary to make the edge of the sole particularly high on the upper. As a result, when a water-vapor-permeable and consequently breathable functional layer and a molded-on or cemented-on outsole are used, an unnecessarily great amount of lining material having this functional layer is not covered by non-breathable outsole plastic and blocked with respect to breathability. The connecting band used according to the invention consequently contributes to the increase in the overall breathability of the footwear.

In the case of the process according to the invention for producing a shoe upper, which is constructed with an upper outer material and a lining material which is arranged on the inner side of the upper outer material and has a waterproof functional layer, an upper outer material piece cut in the shape of the upper is provided, a lining material piece cut in the shape of the upper is provided, the latter piece being cut in such a way that a lower lining material end region piece has a lining edge that is not covered by the upper outer material after the lining material piece has been arranged in the correct position on the inner side of the upper outer material piece, the lower edge of the upper outer material piece is joined along its entire periphery to a first longitudinal side of a connecting band and a lower end of the lining edge is joined along its entire periphery to a second longitudinal side of the connecting band, wherein at points of curvature of the lower periphery of the upper end region the connecting band is provided with in an arcuate shape corresponding to the local radius of curvature, with the two longitudinal sides of the connecting band being provided with different degrees of curvature, in such a way that, for an arc sector lying in the respective curvature, with a predetermined unitary sector angle, the arc lengths of the two longitudinal connecting band sides belonging to this arc sector differ from each other the more, the greater the curvature in the respective arc sector is, the arc length of the first longitudinal side of the connecting band being made longer than the arc length of the second longitudinal side of the connecting band at points with convex curvature of the lower periphery of the upper end region, corresponding to the differing curvatures and arc lengths of the outer material end and the lining material end region.

In one embodiment of the invention, the lining edge that is not covered by the upper outer material is formed by an overhang of the lining material end region with respect to the outer material end region.

In one embodiment of the invention, the connecting band is non-porous.

In a first variation of this embodiment, the non-porous connecting band or part thereof serves as sealing material, which is activated, for example by means of thermal energy, high-frequency energy, infrared energy or UV energy, and thereby temporarily brought into a liquid and adhesive state, in which it develops its adhesive effect. For example, the connecting band has an elastic textile band as a backing, which is coated with a sealing compound.

In a second variation of this embodiment, in which an intermediate sole or outsole is molded onto the footwear, a material which can be melted by the hot-liquid sole material during the molding-on of the sole is used for the connecting band. Since the footwear in this case is kept in shape on the sole side by the molded-on sole, the stability of the footwear is still ensured even if the connecting band completely melts away during the molding-on of the sole.

A polyurethane band is suitable for example for the non-porous connecting band.

In another embodiment of the invention, the connecting band is porous or permeable and preferably has the form of a net band, with such porosity or permeability that it can be penetrated by liquid sealing material. The liquid sealing material is either sole material that is liquid during the molding-on of a sole or, in particular if the footwear is provided with a cemented-on outsole, a sealing adhesive that leads to waterproofness in the cured state, preferably in the form of reactive hot-melt adhesive that leads to waterproofness in the fully reacted state. In this case, the sealing adhesive is essentially only applied to the porous connecting band and seals the functional layer in that region of the upper lining material which is located opposite to the porous connecting band.

It is important that the connecting band is elastic at least on the longitudinal side to be joined to the lining material, while the other longitudinal side of the connecting band may be at least expandable or likewise elastic.

In one embodiment of the invention, the porous or permeable elastic net band has the shape of a ladder, wherein two longitudinal webs that form the two longitudinal sides of the net band are joined by transverse webs uniformly spaced apart in the longitudinal direction of the net band. In this case, at least the longitudinal web to be joined to the lining material is elastic, while the transverse webs are preferably rigid or non-elastic. In one embodiment of the net band, the longitudinal webs consist of unvulcanized rubber, vulcanized rubber, latex or an elastomer, for example Elastan, while the transverse webs preferably consist of polyamide, polyester or a similar non-elastic material.

With regard to an elastic net band formed in such a way, there are several variations, which are suitable for the purpose according to the invention, for example:

both longitudinal webs are 100% plastically deformable by in such a way that formation of folds does not occur at the points of curvature of the periphery of the upper end region;

both longitudinal webs are 100% elastically deformable by in such a way that formation of folds does not occur at the points of curvature of the periphery of the upper end region;

both longitudinal webs are each partially elastically as well as plastically deformable in such a way that formation of folds does not occur at the points of curvature of the upper end region periphery;

one of the two longitudinal webs is partially elastically as well as plastically deformable and the other longitudinal web is 100% plastically deformable in such a way that formation of folds does not occur at the points of curvature of the upper end region periphery;

one of the two longitudinal webs is partially elastically as well as plastically deformable and the other longitudinal web is 100% elastically deformable in such a way that formation of folds does not occur at the points of curvature of the upper end region periphery.

In an embodiment of the invention using an elastic net band, the net band is produced by a weaving operation, the longitudinal webs being formed by longitudinal or warp threads which are woven with transverse or weft threads. Longitudinal threads are provided only in the region of the longitudinal webs. In the central region between the longitudinal webs, remaining free of longitudinal threads, the transverse threads form the transverse webs. In this case, the transverse webs are arranged at such a distance from one another that the net band has adequate permeability for sealing material. To obtain the elasticity, the elastic threads forming the longitudinal threads are subjected to tensile stress during the weaving operation, at least those threads belonging to the longitudinal web that is to be joined to the lining material. The elastic net band can be formed in different ways, according to specific requirements. The possibilities are for only one longitudinal web to be elastic, for both longitudinal webs to be elastic, for the two longitudinal webs to have different elasticity and also for the net band to have zones of different elasticity along its length, in order for example to provide a greater elasticity in the region of the toes and heel of the footwear and a lesser elasticity in the side foot regions of the footwear.

The use of a net band with constant elasticity along the entire periphery of the shoe upper is preferred, wherein the net band may be sewn to the upper outer material while being subjected to a greater longitudinal tensile pre-stress at locations with a smaller radius of curvature, that is in the region of the toes and heel, than in the region of the longitudinal sides of the foot.

The solution according to the invention is suitable both for footwear with an insole and for footwear without an insole.

In the case of footwear without an insole, the upper end region on the sole side is lashed together by a lashing string (also known by the term "string lasting"). In the case of footwear with an insole, the upper material is joined to the insole either by sealing by a Strobel seam, i.e. by means of a Strobel seam connecting the upper material and the insole, or by cement-lasting of a lasting allowance belonging to the lower upper end region to the underside of the insole by means of lasting cement. The use of both fastening methods in combination on one and the same footwear is also possible, with for example the lining material end region being joined to the insole by means of a Strobel seam and the outer material end region being joined to the insole by means of cement-lasting. There is also footwear with a part-insole, which only extends over part of the length of the footwear, the lower end of the upper being lashed together by means of a lashing string over that part of the length of the shoe that has no insole and cement-lasted over that part of the length of the shoe that has the part-insole. In a corresponding way, the elastic connecting band is jooined to the peripheral edge of the insole by means of the Strobel seam or the longitudinal side of the connecting band that is not joined to the upper outer material is fastened to the edge of the lasting allowance.

The use of an elastic connecting band has the effect that, after the connection of one longitudinal side of the connecting band to the upper outer material while being subjected to longitudinal tensile pre-stress, the part of the connecting band that is not joined to the upper outer material flips inward in such a way that this part of the connecting band extends approximately perpendicularly away from the inner side of the upper end region on the sole side and extends approximately parallel to the outsole still to be attached. This is advantageous to the extent that the lateral edge of the molded-on or cemented-on outsole does not need to be as high as in the case where the connecting band is perpendicular to the outsole and/or has folds.

Suitable in particular for sole constructions which have neither a waterproof insole nor a waterproof intermediate sole nor a waterproof outsole is an embodiment of the invention in which there is provided a sheet-like waterproof sealing layer which is applied to the underside of a turned-back upper end region such that it extends parallel to the still to be applied outsole in such a way that a lower opening of the upper is sealed as far as the sealing material zone. The sealing layer is preferably a sealing sheet (also known to those skilled in the art as a gasket), which is cemented onto the underside of the insole or, if it is an insole-free construction with a lashing string, onto the underside of the turned-back, lashed-together upper end region. In one embodiment, the sealing sheet is waterproof and preferably also water-vapor-permeable. It may be constructed with a laminate which has a backing material layer and a waterproof, preferably also water-vapor-permeable functional layer.

Depending on the specific construction of the sole, the sealing layer may also be an intermediate sole or an outsole or else a layer of sealing material, for example in the form of a sealing adhesive applied to the inner side of the outsole or sealing adhesive applied only to the connecting band formed as a net band, in particular in the form of reactive hot-melt adhesive.

In the case of one embodiment of the invention, the functional layer of the upper lining material and/or the sealing sheet has a layer of expanded microporous polytetrafluoroethylene (ePTFE).

For sealing the functional layer by means of the connecting band (if the latter contains sealing material itself) or through the connecting band (if the latter is formed as a porous or permeable net band), any material leading to waterproofness is suitable. In the case of the use of adhesive, having sealing properties, as the sealing material, preference is given to reactive hot-melt adhesive, which seals the sole construction of footwear particularly well. Reactive hot-melt adhesive has, on the one hand, can creep particularly well in the liquid state before fully reacting and, on the other hand, leads particularly high and durable waterproofness in the fully reacted state. The reactive hot-melt adhesive can be applied very simply, it can for example be brushed on, sprayed on or applied in the form of a band of adhesive or a bead of adhesive, the reactive hot-melt adhesive being made tacky by heating and, as a result, being able to be affixed in the region of the connecting band before the full reacting process and accompanying durable adhesive bonding to the functional layer begins.

The adhesive bonding of the reactive hot-melt adhesive or other sealing material to the functional layer is particularly intimate if the reactive hot-melt adhesive or the other sealing material is mechanically pressed against the functional layer after being applied to the connecting band. Preferably suitable for this purpose is a pressing device, for example in the form of a pressing pad, with a smooth material surface which cannot be wetted by the reactive hot-melt adhesive or other sealing material and therefore cannot bond with the reactive hot-melt adhesive or the other sealing material, made for example of non-porous polytetrafluoroethylene (also known by the trade name Teflon), silicone or PE (polyethylene). A pressing pad is preferably used for this purpose is, for example in the form of a rubber pad or air cushion, whose surface is covered with a film of one of the said materials, for example non-porous polytetrafluoroethylene, or such a film is arranged between the sole construction provided with the reactive hot-melt adhesive or the other sealing material and the pressing pad before the pressing operation.

Preferably, a reactive hot-melt adhesive is used which can be cured by means of moisture, which adhesive is applied to the region to be adhesively bonded and exposed to moisture to make it fully react. In one embodiment of the invention, a reactive hot-melt adhesive which can be thermally activated and can be cured by means of moisture is used, which adhesive is thermally activated, applied to the region to be adhesively bonded and exposed to moisture to make it fully react.

Reactive hot-melt adhesives refer to adhesives which, before their activation, comprise relatively short molecular chains with an average molecular weight in the range from approximately 3000 to approximately 5000 g/mol, are non-adhesive and are brought into a state of reaction, possibly by thermal activation, in which the relatively short molecular chains are crosslinked to form longer molecular chains and thereby cure, doing so predominantly in a moist atmosphere. During the reaction or curing time, they are capable of adhesive bonding. After the crosslinking curing, they cannot be re-activated. When they fully react, three-dimensional crosslinking of molecular chains occurs. The three-dimensional crosslinking leads to particularly high protection against water ingress into the adhesive.

Suitable for example for the purpose according to the invention are polyurethane reactive hot-melt adhesives, resins, aromatic hydrocarbon resins, aliphatic hydrocarbon resins and condensation resins, for example in the form of epoxy resin.

Particularly preferred are polyurethane reactive hot-melt adhesives, referred to hereafter as PU reactive hot-melt adhesives.

In one practical embodiment of footwear according to the invention, a PU reactive hot-melt adhesive that is obtainable under the name IPATHERM S 14/242 from the company H. P. Fuller of Wells, Austria, is used. In another embodiment of the invention, a PU reactive hot-melt adhesive, which is obtainable under the name Macroplast QR 6202 from the company Henkel AG, Dusseldorf, Germany, is used.

A functional layer, which is not only water-impermeable but also water-vapor-permeable, is particularly preferred. This makes it possible to produce waterproof shoes, which remain breathable in spite of being waterproof.

A functional layer is regarded as "waterproof", if appropriate including the seams provided of the functional layer, if it ensures a water ingress pressure of at least $1 \times 10^4$ Pa. The material of the functional layer preferably ensures a water ingress pressure of over $1 \times 10^5$ Pa. The water ingress pressure is measured here by a test method in which distilled water is applied at 20±2° C. with increasing pressure to a 100 cm² sample of the functional layer. The pressure increase is 60±3 cm of water column per minute. The water ingress pressure then corresponds to the pressure at which water appears for the first time on the other side of the sample. Details of the procedure are described in ISO Standard 0811 from the year 1981.

A functional layer is regarded as "water-vapor-permeable" if it has a water-vapor permeability coefficient Ret of less than 150 $m^2 \times Pa \times W^{-1}$. The water-vapor permeability is tested by the Hohenstein skin model. This test method is described in DIN EN 31092 (February 1994) or ISO 11092 (1993).

Whether a shoe is waterproof can be tested for example by a centrifuge arrangement of the type described in U.S. Pat. No. 5,329,807.

Suitable materials for the waterproof, water-vapor-permeable functional layer are, in particular, polyurethane, polypropylene and polyester, including polyether esters and their laminates, as described in the publications U.S. Pat. No. 4,725,418 and U.S. Pat. No. 4,493,870. Particularly preferred, however, is expanded microporous polytetrafluoroethylene (ePTFE), as described for example in the publications U.S. Pat. No. 3,953,566 and U.S. Pat. No. 4,187,390, and expanded polytetrafluoroethylene which is provided with hydrophilic impregnating agents and/or hydrophilic layers; see for example the publication U.S. Pat. No. 4,194,041. A microporous functional layer is understood to mean a functional layer whose average pore size lies between approximately 0.2 μm and approximately 0.3 μm.

The pore size can be measured with the Coulter Porometer (trade name), which is produced by Coulter Electronics, Inc., Hialeath, Fla., USA.

If ePTFE is used as the functional layer, the reactive hot-melt adhesive can penetrate into the pores of this functional layer during the cementing operation, which leads to a mechanical anchoring of the reactive hot-melt adhesive in this functional layer. The functional layer consisting of ePTFE may be provided with a thin polyurethane layer on the side with which it comes into contact with the reactive hot-melt adhesive during the cementing operation. If PU reactive hot-melt adhesive is used in conjunction with such a functional layer, there occurs not only the mechanical bond but also a chemical bond between the PU reactive hot-melt adhesive and the PU layer on the functional layer. This leads to a particularly intimate adhesive bonding between the functional layer and the reactive hot-melt adhesive, so that particularly durable waterproofness is ensured.

Leather or textile fabrics are suitable for example as the upper outer material. The textile fabrics may be, for example, woven or knitted fabrics, nonwovens, a fleece or felt. These textile fabrics may be produced from natural fibers, for example from cotton or viscose, from synthetic fibers, for example from polyesters, polyamides, polypropylenes or polyolefins, or from blends of at least two such materials.

When a functional layer is used, a lining material is normally arranged on the inner side. The same materials as are specified above for the upper outer material are suitable as lining material, which is often combined with the functional layer to form a functional-layer laminate. The functional-layer laminate may also have more than two layers, it being possible for a textile backing to be located on the side of the functional layer remote from the lining layer.

The outsole of footwear according to the invention may consist of waterproof material, such as for example rubber or plastic, for example polyurethane, or of non-waterproof, but breathable material, such as in particular leather, leather provided with rubber or plastic intarsias or rubber or plastic provided with leather intarsias. In the case of non-waterproof outsole material, the outsole can be made waterproof, while maintaining breathability, by being provided with a waterproof, water-vapor-permeable functional layer at least at points at which the sole construction has not already been made waterproof by other measures.

The insole of footwear according to the invention may consist of viscose, a nonwoven, for example polyester nonwoven, to which fusible fibers may be added, leather or adhesively bonded leather fibers. An insole is obtainable under the name Texon Brandsohle from Texon Mockmuhl GmbH of Mockmuhl, Germany. Insoles of such materials are water-permeable. An insole of such material or other material can be made waterproof by arranging a layer of waterproof material on one of its surfaces or inside it. For this purpose, for example, a film with Kappenstoff V25 from the company Rhenoflex of Ludwigshafen, Germany, may be ironed on. If the insole is to be not only waterproof but also water-vapor-permeable, it is provided with a waterproof, water-vapor-permeable functional layer, which is preferably constructed with ePTFE (expanded, microporous polytetrafluoroethylene). Suitable for this for example is a laminate, which contains a waterproof, water-vapor-permeable functional layer and is obtainable under the trade name TOP DRY from W. L. Gore & Associates GmbH, Putzbrunn, Germany.

A further possibility is to adhesively attach such a laminate (TOP DRY) from beneath onto the insole and at least onto the lasted overhang of the lining, whereby the upper is made waterproof before an outsole is cemented on.

The invention is now explained in more detail on the basis of embodiments.

The drawings show several embodiments of footwear according to the invention in different stages of production.

In the text which follows, terms such as top and lower refer to footwear that is in the normal position, that is with the outsole facing downward, even if the drawings show shoes in the inverted position.

Figures 1, 2:
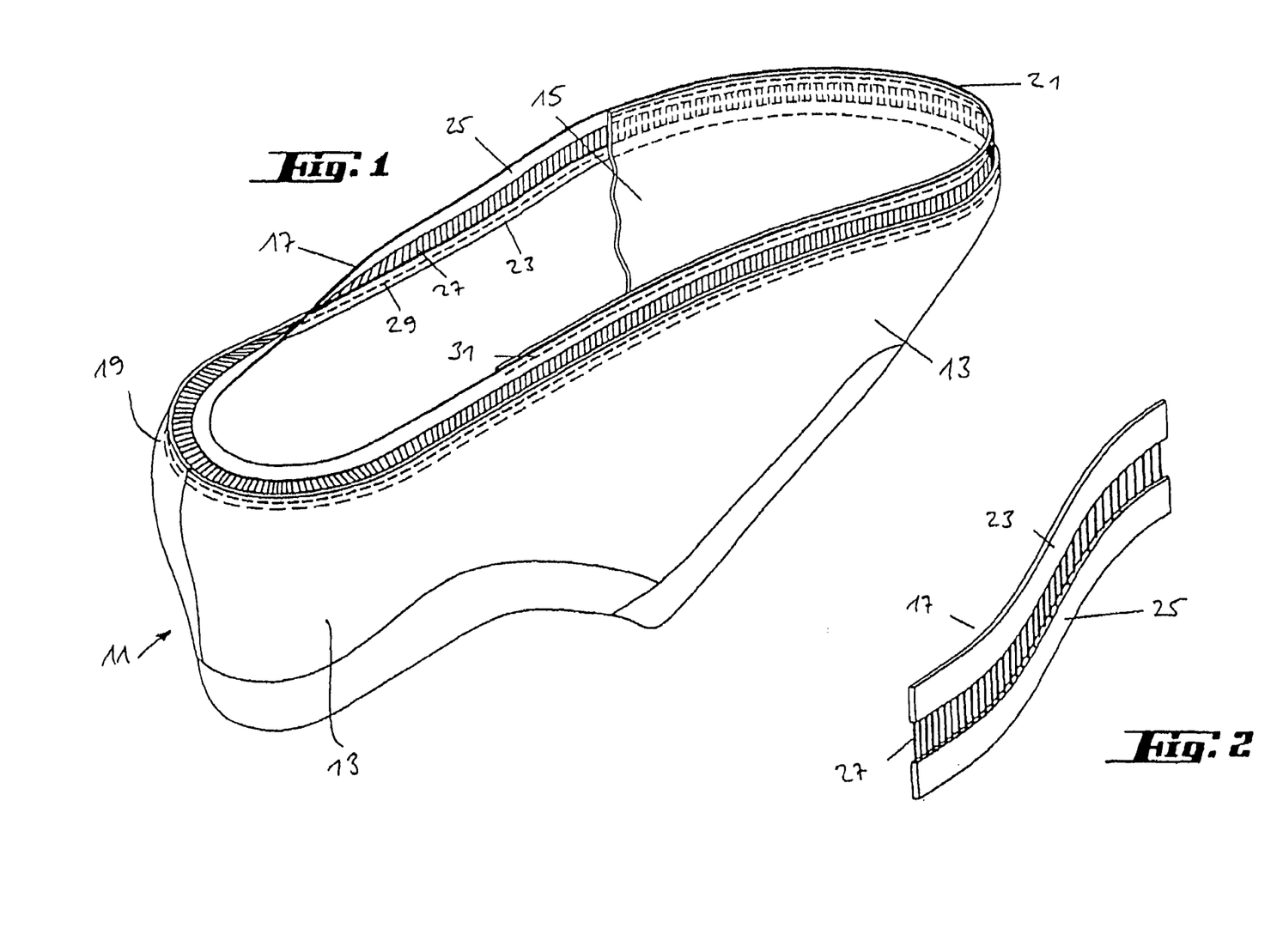
FIG. 1 shows in an oblique view a plan view of the underside of footwear according to the invention with a net band.
FIG. 2 shows an oblique view of an embodiment of an elastic net band used in FIG. 1.

FIG. 1 shows an upper 11 with an upper outer material 13, an upper lining material 15 and an elastic net band 17, by means of which an outer material end region 19 and a lining material end region 21 are joined to each other.

The net band 17, shown enlarged in FIG. 2, comprises a first longitudinal web 23 and a second longitudinal web 25, which are joined to each other by means of transverse webs 27. As can be seen in FIG. 1, the first longitudinal web 23 is joined to the end region 19 of the outer material by means of a first seam 29 and the second longitudinal web 25 is joined to the end region 21 of the lining material by means of a second seam 31.

At least the second longitudinal web 25 consists of elastic material and is sewn to the end region 21 of the lining material while being subjected to longitudinal tensile prestress. The first longitudinal web 23 may, but does not have to, be elastic. The transverse webs 27 may be elastic, but are preferably non-elastic.

In one embodiment of the elastic net band 17, the two longitudinal webs 23 and 25 consist of latex rubber or some other (rubber-like) material with elastic behavior (for example Lycra, etc.) and the transverse webs 27 consist of polyamide, polyester or a similar material. The length of the transverse webs 27 and their spacing from one another are chosen such that the waterproof, water-vapor-permeable functional layer that is present in the lining material 15 of the upper can be wetted adequately by sealing material passing through the net band 17.

An embodiment of a currently preferred elastic net band has a width of approximately 10 mm, of which the two longitudinal webs 23 and 25 each take up approximately 3.5 mm and the clearance, that is the length of the free transverse webs 27, takes up approximately 3 mm. In this case, the transverse webs 27 have a spacing of approximately 0.25 mm. In general, the choice of the spacing of the transverse webs is to be based on the specific application, account having to be taken in particular of the viscosity of the sealing material by which the net band is intended to be penetrable.

In another embodiment for ski boots, the net band 17 has a width of approximately 15 mm.

In an embodiment of the net band with the above dimensions, it is a woven, elastic band with warp or longitudinal threads of natural rubber and textured polyamide threads, a material composition of 40% natural rubber, 40% monofilament polyamide and 20% textured polyamide being preferred.

Such a net band is preferably produced by a weaving operation. In this case, warp or longitudinal threads are located only in the region of the two longitudinal webs 23 and 25, so that the transverse or weft threads lie free in the region between the two longitudinal webs 23 and 25 and can consequently form the transverse webs 27. Elastic longitudinal threads, preferably made of rubber, and non-elastic longitudinal threads, preferably made of polyamide, are used as longitudinal threads for the longitudinal webs 23 and 25, only non-elastic threads, preferably likewise made of polyamide, are used for the transverse webs. During the operation of weaving the elastic net band 17, the elastic longitudinal threads are stretched by a predetermined degree and the non-elastic longitudinal threads are arranged parallel to the stretched elastic longitudinal threads. In this state, the longitudinal threads are woven with the transverse threads. After the weaving operation, the elastic longitudinal threads contract and the net band 17 relaxes correspondingly.

In the production of this net band, different elasticity values can be produced for the two longitudinal webs 23 and 25, either by using differently expandable bands for the two longitudinal webs 23 and 25 or by stretching the two longitudinal webs 23 and 25 to different extents during the operation of weaving them with the transverse webs 27.

During the sewing of the net band 17 to the upper 11, firstly the first longitudinal web 23 is sewn to the end region 19 of the outer material, while being subjected to longitudinal tensile pre-stress. After securely sewing the first longitudinal web 23 to the end region 19 of the outer material, the remaining part of the net band with the second longitudinal web 25 and the transverse webs 27 flips inward, as shown in FIG. 1 in the heel region of the upper. This flipping over is a consequence of the sewing of the first longitudinal web 23 to the end region 19 of the outer material while being subjected to longitudinal tensile pre-stress. The flipping over has the effect that the net band 17 assumes a position in which it extends substantially parallel to the outsole to be applied later. This flipping over also takes place in the toe region of the upper 11, which in most cases will then lead to the flipping over of the net band 17 over its entire length. In FIG. 1, the flipping over of the net band 17 is shown only in the heel region of the upper 11, in order to allow the connection of the lining material 15 of the upper to the net band 17 in the front foot region to be represented better.

The following figures show various embodiments of footwear according to the invention in a later stage of production than FIG. 1, each in a perspective plan view of the underside, partly in sectional view, and a part-cross-sectional view. The embodiments represented in FIGS. 3–11 differ from one another with regard to the sealing material and/or the sole construction.

Figures 3, 4:
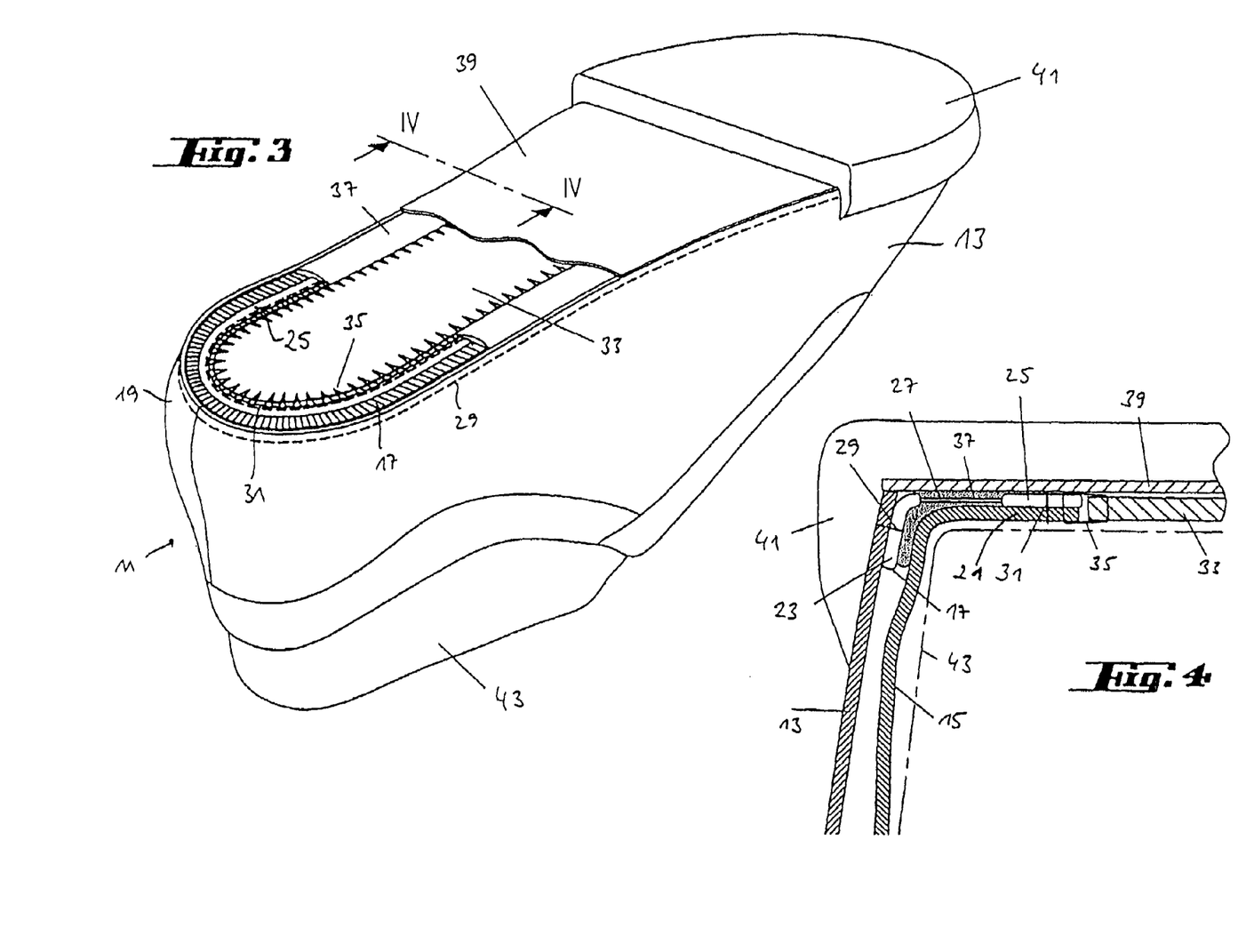
FIG. 3 shows a shoe of the style according to the invention with an insole attached by a Strobel seam.
FIG. 4 shows a partial sectional view of the construction according to FIG. 3.

FIGS. 3 and 4 show an embodiment of footwear according to the invention, which has been stretched onto a last 43, and has an insole attached by a Strobel seam and an adhesively attached outsole.

On the basis of the upper 11 shown in FIG. 1, with a net band 17, in the embodiment shown in FIGS. 3 and 4, an insole 33 is joined to the second longitudinal web 25 of the elastic net band 17 by means of a Strobel seam 35. In this case, the net band 17 extends in the plane of the insole 33.

In a width which corresponds approximately to the width of the net band 17, a sealing material, in the form for example of sealing adhesive 37, is applied to the net band 17 forming a closed sealing material zone which extends in the peripheral direction of the upper end region, wherein the sealing adhesive 37, penetrating through the net band 17, forces its way as far as the functional layer of the upper lining material 15, and seals it in a waterproof manner.

For the case in which neither the insole 33 nor an intermediate sole or outsole 41 still to be applied is waterproof, the underside of the insole facing the outsole 41 is covered by a sealing sheet 39 (a gasket), which has a waterproof functional layer, which is preferably likewise water-vapor-permeable, in order to maintain breathability also in the sole region of the shoe in spite of waterproofness. The sealing sheet 39 need not—as represented in FIG. 3—extend as far as the outer edge of the net band 17. It is sufficient for it to extend by an amount, which covers the insole, 33 and the Strobel seam 35, the sealing sheet 39 overlapping with the sealing adhesive 37 in order to achieve secure sealing of the sole construction.

Due to its good ability to creep in the liquid, non-reacted state and its good and durable waterproofness in the fully reacted state, reactive hot-melt adhesive, in particular polyurethane reactive hot-melt adhesive, is preferably used as the sealing adhesive 37. Due to its ability t creep in the liquid, non-reacted state, the reactive hot-melt adhesive has the ability to penetrate the elastic net band 17 to a particularly high degree, to force its way as far as the functional layer of the lining material 15 of the upper and wet the latter, the reactive hot-melt adhesive getting under the transverse webs of the net band 17 and consequently making it possible for the functional layer to be wetted with the reactive hot-melt adhesive across its full surface area, and consequently the adhesive has the ability to prevent the water which has forced its way via the upper outer material 13 as far as the net band 17 from getting inside the lining material 15 of the upper and consequently to the inside of the shoe.

Figures 5, 6:
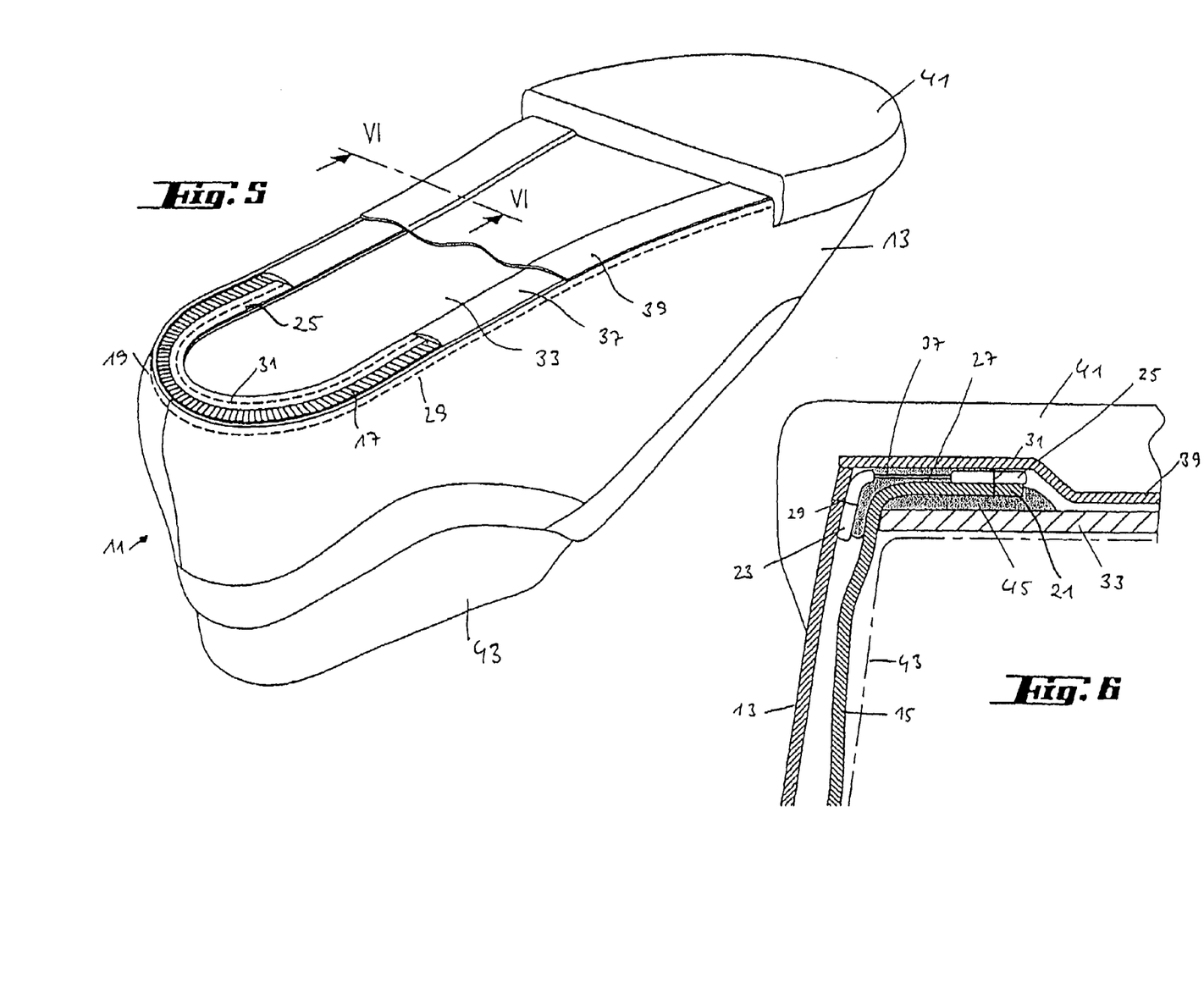
FIG. 5 shows an embodiment of a cement-lasted shoe with an insole.
FIG. 6 shows a partial sectional view of the construction according to FIG. 5.

In the case of the embodiment shown in FIGS. 5 and 6, the turned-back part of the upper end region on the sole side is fastened to the insole 33 by cement-lasting. The cement-lasting takes place by means of lasting cement 45, which can be seen in the cross-sectional view in FIG. 6.

Also in this embodiment, on the lower side of the net band 17 (facing the outsole 41) there is a sealing adhesive 37, preferably in the form of reactive hot-melt adhesive, as already explained in connection with the embodiment of FIGS. 3 and 4.

Also in this embodiment, a sealing sheet 39 or a continuous layer of reactive hot-melt adhesive applied across the entire surface area may be provided for the case where the outsole 41 is not waterproof.

Figures 7, 8, 9:
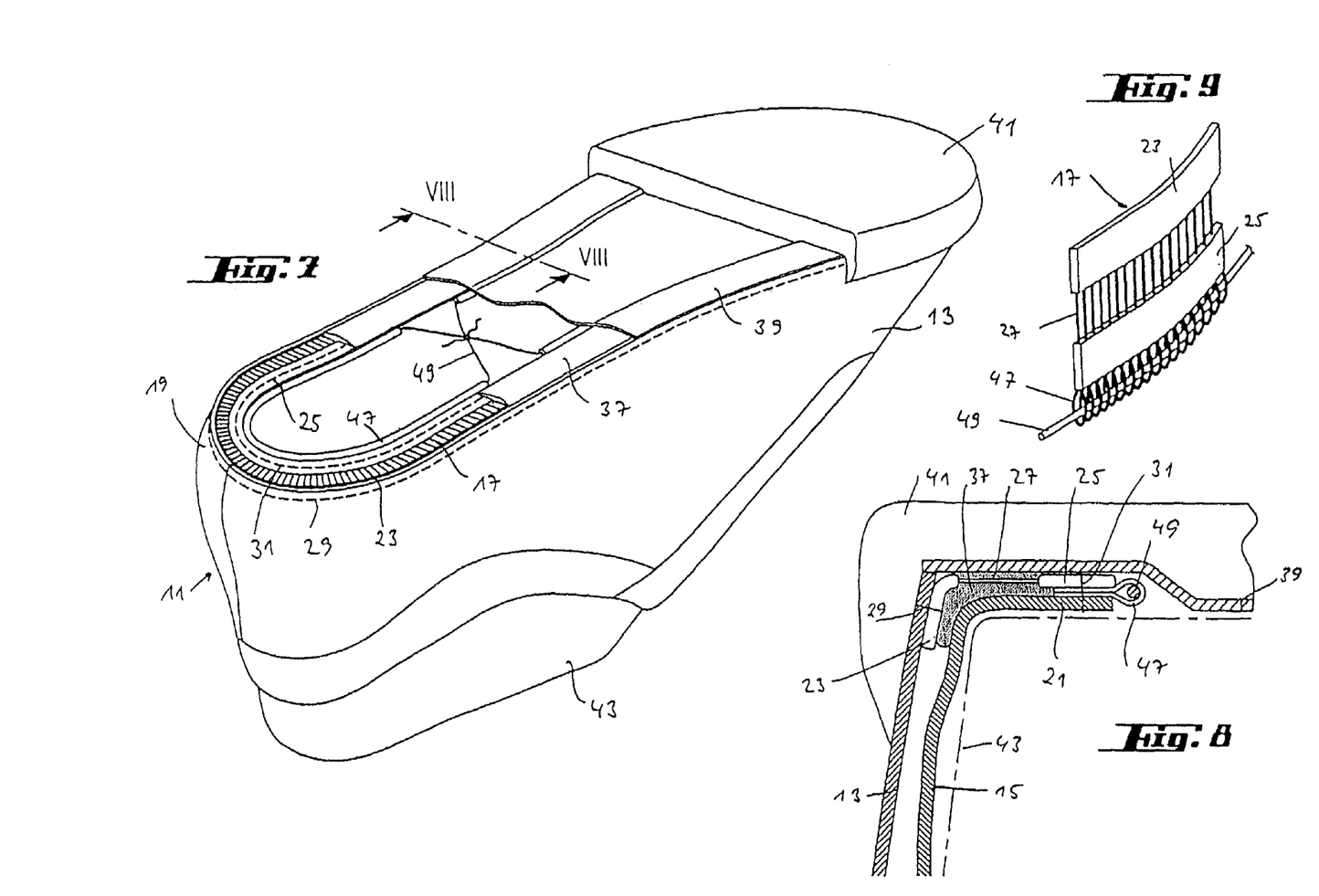
FIG. 7 shows a shoe without an insole with a lashing string (string lasting)
FIG. 8 shows a partial sectional view of the construction shown in FIG. 7.
FIG. 9 shows an embodiment of an elastic net band which can be used in FIG. 7, with an integrated string-lasting tunnel and lashing string.

FIGS. 7–9 show an embodiment of a shoe without an insole, in which the upper end region on the sole side extending parallel to the outsole 41 is stretched or lashed together by means of a lashing string 49. The lashing string 49 is guided in a string-lasting tunnel 47, which is for example attached to the second longitudinal web 25 of the elastic net band 17 in the way shown in FIG. 9. As FIG. 7 shows, the string-lasting tunnel 47 is open at two points of the periphery of the shoe which are located between the heel region and the toe region, in order to allow the lashing string 49 to be gripped, tautened and knotted here.

Also in this embodiment, sealing adhesive 37, preferably again in the form of reactive hot-melt adhesive, is applied to the net band 17, reference being made here to the explanations in connection with FIG. 3 with regard to details.

While FIG. 9 shows an embodiment in which the string-lasting tunnel 47 is attached directly to the net band 17, FIG. 8 shows an embodiment in which an initially separate string-lasting tunnel 47 with a lashing string 49 located in it is securely sewn by means of the second seam 31 between the second longitudinal web 25 of the net band 17 and the end region 21 of the lining material.

The shoe construction corresponding to FIGS. 7 to 9 may be modified by molding onto the underside of the upper end region a sole made of waterproof material, which may be an intermediate sole or an outsole, by means of which sealing of the sole structure is brought about. In this case, neither a gasket nor a layer of sealing material or reactive hot-melt adhesive layer is required.

Figures 10, 11:
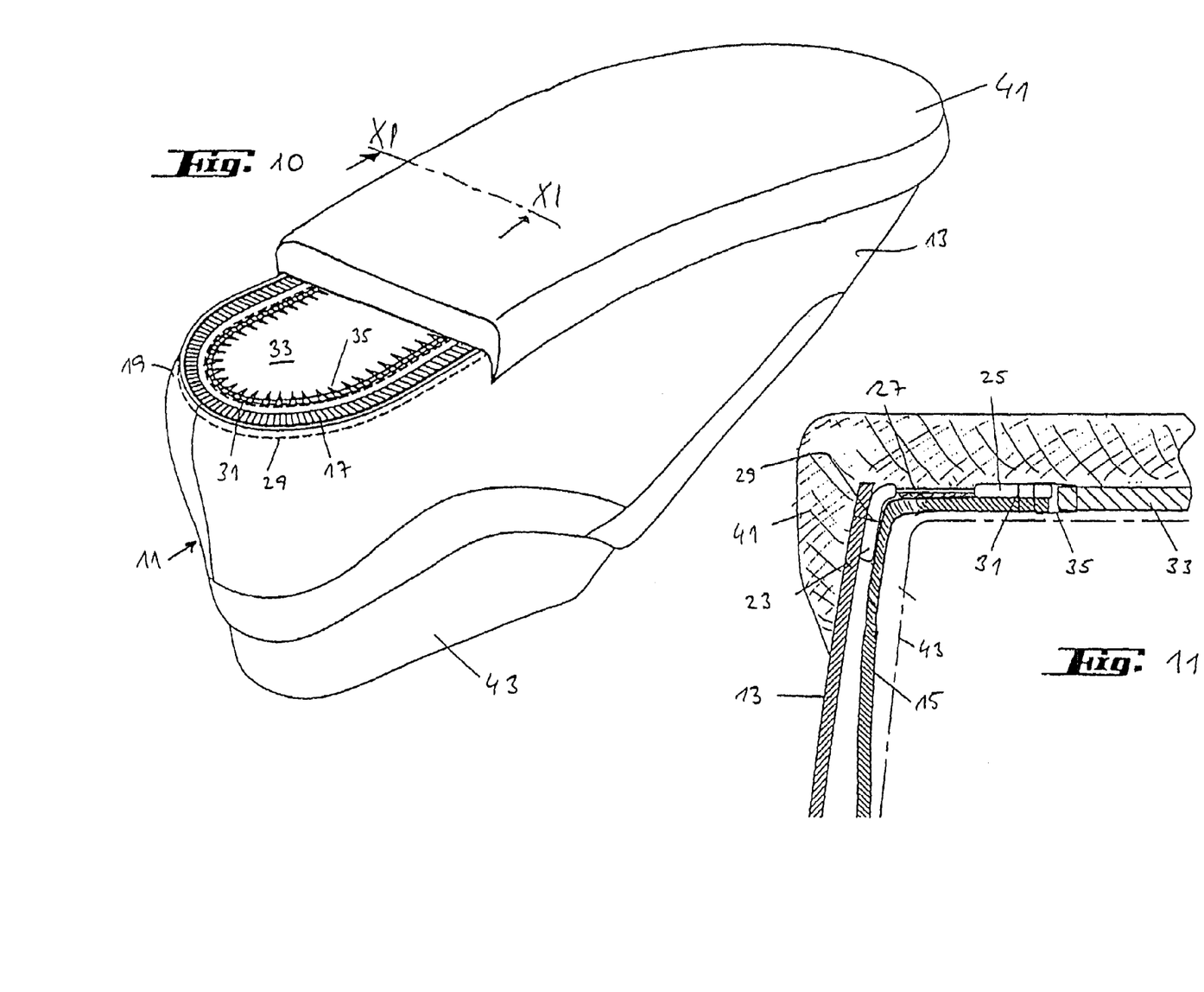
FIG. 10 shows an embodiment of a shoe according to the invention with a molded-on sole.
FIG. 11 shows a partial sectional view of this embodiment.

FIGS. 10 and 11 show an embodiment in which the sealing material is formed by sole material of a sole, which may be for example an intermediate sole or the outsole 41. In this embodiment, all the production steps up to the fastening of the insole to the net band 17 by means of a Strobel seam 35 proceed in the way shown in FIGS. 3 and 4 and explained there or by means of a lashing string as explained in connection with FIGS. 7 to 9. In contrast to the embodiment in FIGS. 3 and 4, no sealing adhesive 37 and no gasket is applied in the embodiment according to FIGS. 10 and 11. In the embodiment according to FIGS. 10 and 11, the shoe has a molded-on sole 41. The sole material, which is liquid when the sole 41 is molded on, penetrates through the net band 17, wets the functional layer of the upper lining material 15 in the region of the net band 17 and brings about sealing of the functional layer in this region. The sealing function, which in the embodiments of FIGS. 3 and 7 is undertaken by separately applied sealing adhesive 37, is performed in the embodiment according to FIG. 10 by the sole adhesive.

A sealing sheet 39, as shown in the previous embodiments, is not required in the embodiment according to FIG. 10, because the molded-on outsole 41 seals the entire region of the sole structure.

While the embodiment according to FIG. 10 is suitable only for shoes with a molded-on sole, the embodiments according to FIGS. 5 and 7 can be used for soles which are not molded on, that is to say for soles which are adhesively attached, which may be plastic soles and consequently waterproof soles, so that the sealing sheet 39 is not required, or water-permeable soles, for example made of leather, in which case the sealing sheet 39 is recommended to make the sole construction waterproof, the sealing sheet preferably being not only waterproof but also water-vapor-permeable.

Figure 12:
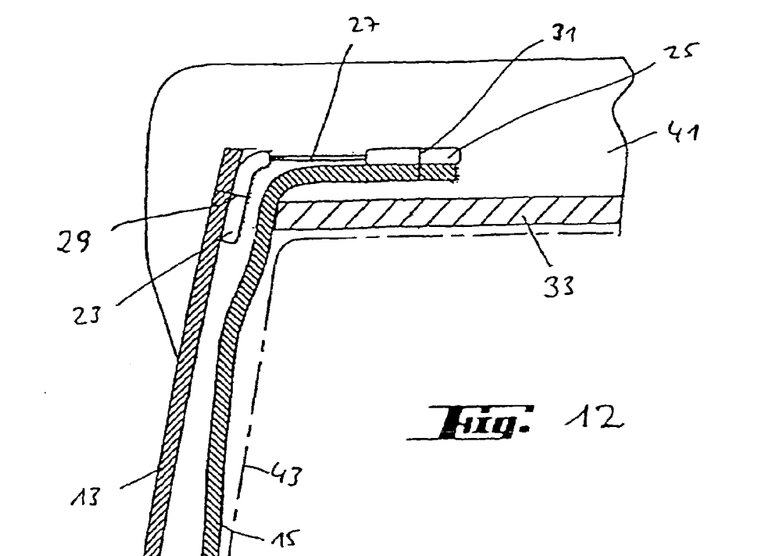
FIG. 12 shows a partial sectional view of a construction with sealing by means of a molded-on sole.

FIG. 12 shows a partial sectional view of a cement-lasted shoe construction with a molded-on sole 41, which may be an intermediate sole or an outsole. During the molding on of the sole 41, liquid sole material penetrates through the net band 17, forces its way as far as the functional layer of the lining material 15 and seals the functional layer. A gasket or a layer of sealing material is therefore not required. Otherwise, the construction in FIG. 12 corresponds to the construction shown in FIG. 6.

Figure 13:
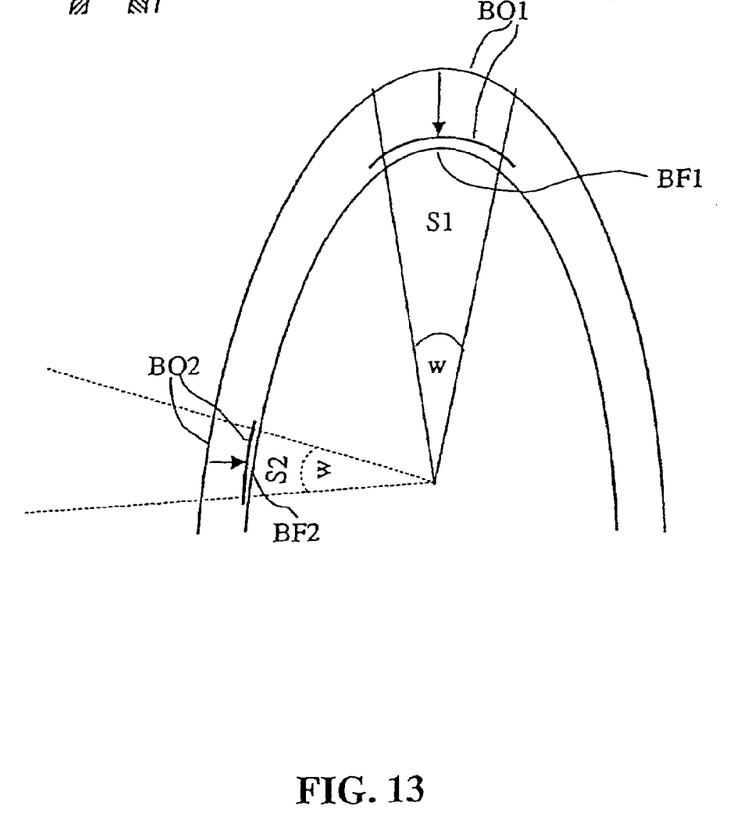
FIG. 13 shows a diagram to explain some of the terms used in the present document.

On the basis of FIG. 13, the terms used above, arc sector, arc lengths and unitary sector angle, are now also explained. FIG. 13 shows two elliptical arcs, an outer elliptical arc and an inner elliptical arc, which are intended respectively to represent the longitudinal side of the connecting band that is joined to the outer material end region and the longitudinal side of the connecting band that is joined to the lining material end region. At a point of strong elliptical curvature and at a point of weak elliptical curvature, an arc sector S1 and an arc sector S2 are respectively formed by means of the two lines of an angle. Both arc sectors S1 and S2 have the same angle w, which is referred to here as the unitary sector angle. The lines of the angle of the arc sector S1 form the borders of an outer arc length BO1 of the outer ellipse and an inner arc length BF1 of the inner ellipse. In this case, BO represents the arc length of the outer material and BF represents the arc length of the lining material. The lines of the angle of the arc sector S2 form the borders of an outer arc length BO2 of the outer ellipse and an inner arc length BF2 of the inner ellipse. The arc lengths BO1 and BO2 are duplicated and offset as thick lines close to the arc length BF1 and BF2, respectively, in order to show the differences in length between BO1 and BF1 on the one hand and between BO2 and BF2 on the other hand. It can be seen on the one hand that there are differences in length between the outer arc lengths and the inner arc lengths of the respective sector and on the other hand that this difference in length is much greater at the point of stronger elliptical curvature than at the point of weaker elliptical curvature.

When using a conventional net band, which cannot compensate for these differences in length, formation of folds is caused. When using a connecting band according to the invention, by means of which such differences in length can be compensated, formation of folds is avoided. The fact that the differences between outer and inner arc lengths are different at points with different degrees of elliptical curvature shows on the one hand that the conical connecting band conventionally used cannot avoid formation of folds and shows on the other hand that an elastic net band with which an arc length compensation can be produced without problems and simply, even in the case of differences of differing magnitude between the outer arc length and the inner arc length, is to be particularly preferred.

In the case of use of an elastic connecting band, it should have a minimum elasticity, that is to say minimum extendibility before reaching plastic deformation, in order to achieve the adaptation to the different arc lengths at the peripheral edges of the outer material end region and the lining material end region, and consequently at the two longitudinal sides of the elastic connecting band, even at points of strong curvature of the periphery of the upper end region. The elastic extendibility should be enough for the elastic connecting band to be able to be sewn onto the upper outer material with adequate longitudinal tensile pre-stress to prevent formation of folds in the connecting band and the upper lining material that is sewn to it. The elastic restoring force of the elastic connecting band should be enough to provide the connecting band with the pre-stressing force required for arc length compensation. General values or limits for the elasticity, the longitudinal tensile pre-stress and the elastic restoring force cannot be given, since they depend on the specific form of shoe and the associated maximum curvatures of the periphery of the upper end region. However, it should be an easy matter for a person skilled in the relevant art to determine and select the elasticity parameters of the connecting band that are suitable for a specific shoe.

Suitable in particular as elastic material for the elastic longitudinal web or the elastic longitudinal webs of the elastic connecting band are unvulcanized rubber, vulcanized rubber, elastic plastics, such as synthetic rubber, PVC, silicone, PU for example, and textile materials in which rubber filaments and/or filaments of such materials are incorporated.

The elastic connecting band has an extendibility of at least approximately 20%. The connecting band preferably has an extendibility of at least approximately 30%, with particular preference of at least approximately 40% and most particular preference of at least approximately 50%. These extendibility values have in this case an elastic elongation component of at least 40%. The elastic elongation component is preferably 100%. In particular, at least the longitudinal web of the elastic connecting band that is to be joined to the lining material end region has an elastic extendibility that is as high as possible, in order to achieve the desired freedom from folds at the points of the lower periphery of the upper end region having a strong curvature.

In a practical example of an elastic net band used for the invention, with the dimensions already mentioned (net band width 10 mm, longitudinal web widths each approximately 3.5 mm, transverse web length approximately 3 mm, transverse web spacings approximately 0.25 mm) and the already mentioned materials (longitudinal webs: woven, elastic band with warp or longitudinal threads made of natural rubber and textured polyamide threads with a material composition of 40% natural rubber, 40% monofilament polyamide and 20% textured polyamide; transverse webs: polyester), the following rounded average values have been obtained from the measurements of several samples:

elongation of 66% while being subjected to a stretching force of 50 N elongation of 85% while being subjected to a stretching force of 100 N elongation of 100% while being subjected to a stretching force of 150 N elongation at breakage of 124% while being subjected to a stretching force of 206 N In comparison with this, a net band as used in conventional footwear and having a width of likewise 10 mm has the following values, likewise averaged from three samples:

elongation of 4% while being subjected to a stretching force of 50 N elongation of 10% while being subjected to a stretching force of 100 N elongation of 15% while being subjected to a stretching force of 150 N elongation at breakage of 30% while being subjected to a stretching force of 360 N Values for the elasticity and restoring force are determined by tensile test measurements on the basis of European Standard EN ISO 13934-1 of April 1999 using an Instron test device (where Instron is the name of a manufacturer).

With regard to elongation and elasticity, the following definitions devised for the textile sector have been adopted for the present application.

Elongation:

Tensile loading of a material causes an elongation—with respect to its original length. A distinction is drawn between elongation at breakage, elastic elongation and permanent elongation. In the case of elongation at breakage, the lengthening at the time of breakage is determined. Loading below the breaking limit leads to an elongation that is reversed when the material is relieved of loading (elastic elongation), by contrast with irreversible permanent elongation, which leads to a change in shape of the material.

Elasticity:

Ability of a material to reverse the change in shape caused by the action of a force (bending, pressure, tension, etc.) when the effect of the force subsides.

The invention claimed is:

1. A shoe upper, having:
   an upper outer material with a lower end region of the outer material located in a lower upper end region,
   an upper lining material, which is arranged on the inner side of the upper outer material, incorporates a waterproof functional layer and has a lower end region of the lining material, the end region of the lining material having a lining edge that is not covered by the upper outer material,
   and a connecting band, which extends around the periphery of the upper end region and is joined on a first longitudinal side to the end region of the outer material but not to the end region of the lining material, and is joined on a second longitudinal side to the end region of the lining material but not to the end region of the outer material,
   band wherein at points of curvature of the lower periphery of the upper end region the connecting band extends in an arc corresponding to the local radius of curvature, with the two longitudinal sides of the connecting band having different degrees of curvature band, in such a way that, for an arc sector lying in the respective curvature, with a predetermined unitary sector angle, the arc lengths of the two longitudinal connecting band sides belonging to this arc sector differ from each other the more, the greater the curvature of the respective arc sector is, the arc length of the first longitudinal side of the connecting band being longer than the arc length of the second longitudinal side of the connecting band at points with convex curvature of the lower periphery of the upper end region, corresponding to the differing curvatures and arc lengths of the outer material end and the lining material end region.

2. The shoe upper as claimed in claim 1, in which the arc length of the second longitudinal side of the connecting band is longer than the arc length of the first longitudinal side of the connecting band at points of the upper end region periphery with a concave curvature.

3. The shoe upper as claimed in claim 1, in which the lining edge that is not covered by upper outer material is formed by an overhang of the end region of the lining material with respect to the end region of the outer material.

4. The shoe upper as claimed in claim 1, with a substantially rigid connecting band, in which the differences in arc length of the two longitudinal sides of the connecting band, which are dependent on the respective arc curvature, are incorporated correspondingly into the band at the production stage.

5. The shoe upper as claimed in claim 4, with a punched connecting band.

6. The shoe upper as claimed in claim 4, with an injection-molded connecting band.

7. The shoe upper as claimed in claim 1, with an elastic connecting band, which is joined on its first longitudinal side to the outer material end region while being subjected to longitudinal tensile pre-stress.

8. The shoe upper as claimed in claim 1, with a deformable connecting band, which is joined on its first longitudinal side to the outer material end region while being subjected to longitudinal tensile pre-stress leading to plastic deformation.

9. The shoe upper as claimed in claim 1, in which the connecting band is joined on its second longitudinal side to the lining material end region while being subjected to longitudinal tensile pre-stress.

10. The shoe upper as claimed in claim 1, in which the first longitudinal side of the connecting band is sewn to the end region of the outer material.

11. The shoe upper as claimed in claim 1, in which the second longitudinal side of the connecting band is sewn to the lining material end region.

12. The shoe upper as claimed in claim 1, whose connecting band is non-porous.

13. The shoe upper as claimed in claim 12, whose connecting band is constructed with a sealing material which can be activated by means of activation energy, selected from the following forms of energy thermal energy, high-frequency energy, infrared energy and UV energy, into a temporarily liquid state.

14. The shoe upper as claimed in claim 12 for footwear with a molded-on sole, whose connecting band consists of a material which can be melted by hot-liquid sole material during the molding-on of the sole.

15. The shoe upper as claimed in claim 12, whose connecting band is formed by a polyurethane band.

16. The shoe upper as claimed in claim 1, whose connecting band is porous in such a way that it can be penetrated by liquid sealing material.

17. The shoe upper as claimed in claim 16, whose connecting band is formed by a net band, which has a first longitudinal web on its first longitudinal side and a second longitudinal web on its second longitudinal side, which webs are joined to each other by means of transverse webs.

18. The shoe upper as claimed in claim 17, in which at least the second longitudinal web is constructed using elastically compliant material.

19. The shoe upper as claimed in claim 17, in which the transverse webs are constructed using non-elastic material.

20. The shoe upper as claimed in claim 17, in which the net band is woven, wherein longitudinal threads, serving as warp threads, of which at least some are elastic, at least with regard to the first longitudinal web, are present only in the regions of the longitudinal webs, and the transverse webs are formed by weft threads.

21. The shoe upper as claimed in claim 1, in which the lining material end region and the second longitudinal side of the connecting band are joined to a string-lasting tunnel, in which is a lashing string is arranged, which is longitudinally movable in relation to the string-lasting tunnel and whose lashing together tautens the lower upper end region in the inward direction in such a way that the lower upper end region with the lining edge and the connecting band extend in the direction of the extent of an outsole still to be applied.

22. The shoe upper as claimed in claim 1, whose functional layer is water-vapor-permeable.

23. The shoe upper as claimed in claim 22, whose functional layer has a layer of microporous PTFE.

24. The shoe upper as claimed in claim 8, whose connecting band has an extendibility of at least 20%.

25. Footwear with a shoe upper as claimed in claim 1.

26. The footwear as claimed in claim 25, with a sealing material, which seals the end region of the lining material in a waterproof manner in a sealing material zone that is located in the region of the connecting band and extends in the peripheral direction of the upper end region.

27. The footwear as claimed in claim 26 with a molded-on sole, whose sealing material is formed by sole material which is liquid during the molding-on of the sole and, which by penetrating through the porous connecting band, seals in a waterproof manner at least part of the width of the lining edge that is not covered by upper outer material.

28. The footwear as claimed in claim 26, whose sealing material is formed by adhesive which leads to waterproofness in the cured state and, which by penetrating through the porous connecting band, seals in a waterproof manner at least part of the width of the lining edge that is not covered by upper outer material.

29. The footwear as claimed in claim 28, with sealing material in the form of reactive hot-melt adhesive, which leads to waterproofness in the fully reacted state.

30. The footwear as claimed in claim 25, with an insole, wherein the lower upper end region with the lining edge and the connecting band extend in the direction of extent of the insole.

31. The footwear as claimed in claim 30, in which the insole is joined to the lining material end region and the second longitudinal side of the connecting band by means of a Strobel seam.

32. The footwear as claimed in claim 30, in which the lower upper end region is lasted by means of lasting cement onto a lower peripheral edge of the insole.

33. The footwear as claimed in claim 25, with a sheet-like waterproof sealing layer, which is applied to the underside of a turned-back upper end region such that it extends parallel to a still to be applied sole in such a way that a lower opening of the upper is sealed as far as the sealing material zone.

34. The footwear as claimed in claim 33, in which the sealing layer is formed by a sealing sheet, which is cemented onto the underside of the insole.

35. The footwear as claimed in claim 34, whose sealing sheet has a waterproof functional layer.

36. A process for producing a shoe upper, which is constructed with an upper outer material and a lining material which is arranged on the inner side of the upper outer material and has a waterproof functional layer, with the following production steps:
    an upper outer material piece cut in the shape of the upper is provided;
    a lining material piece cut in the shape of the upper is provided, cut in such a way that a lower lining material end region piece has a lining edge that is not covered by the upper outer material after the lining material piece has been arranged in the correct position on the inner side of the upper outer-material piece;
    the lower edge of the upper outer material piece is sewn across its entire periphery to a first longitudinal side of a connecting band; and
    a lower end of the lining edge is sewn across its entire periphery to a second longitudinal side of the connecting band;
    at points of curvature of the lower periphery of the upper end region the connecting band being provided with an arcuate shape corresponding to the local radius of curvature, with different degrees of curvature of the two longitudinal sides of the connecting band, in such a way that, for an arc sector lying in the respective curvature, with a predetermined unitary sector angle, the arc lengths of the two longitudinal connecting band sides belonging to this arc sector differ from each other the more, the greater the curvature in the respective arc sector is, the arc length of the first longitudinal side of the connecting band being made longer than the arc length of the second longitudinal side of the connecting band at points with convex curvature of the lower periphery of the upper end region, corresponding to the differing curvatures and arc lengths of the outer material end and the lining material end region.

37. The process as claimed in claim 36, in which the arc length of the second longitudinal side of the connecting band is made longer than the arc length of the first longitudinal side of the connecting band at points of the upper end region periphery with concave curvature.

38. The process as claimed in claim 36, in which the lining edge that is not covered by upper outer material is formed by an overhang of the end region of the lining material with respect to the end region of the outer material.

39. The process as claimed in claim 36, using a substantially rigid connecting band, in which the differences in arc length of the two longitudinal sides of the connecting band, which are dependent on the respective arc curvature, are incorporated correspondingly into the band at the production stage.

40. The process as claimed in claim 39, using a punched connecting band.

41. The process as claimed in claim 39, using an injection-molded connecting band.

42. The process as claimed in claim 36, using an elastic connecting band, which is joined on its first longitudinal side to the outer material end region while being subjected to longitudinal tensile pre-stress.

43. The process as claimed in claim 36, using a deformable connecting band, which is joined on its first longitudinal side to the outer material end region while being subjected to longitudinal tensile pre-stress leading to plastic deformation.

44. The process as claimed in claim 36, in which the lower end of the lining edge is sewn to the second longitudinal side of the elastic connecting band, the latter being subjected to longitudinal tensile pre-stress band leading to elastic deformation.

45. The process as claimed in claim 36, using a connecting band which is constructed with a sealing material which can be activated by means of activation energy, selected from the following forms of energy thermal energy, high-frequency energy, infrared energy and UV energy, into a temporarily liquid state.

46. The process as claimed in claim 36, using a connecting band made of a material which can be melted by hot-liquid sole material during the molding-on of the sole.

47. The process as claimed in claim 45, using a connecting band formed by a polyurethane band.

48. The process as claimed in claim 36, using a porous connecting band which can be penetrated by liquid sealing material.

49. The process as claimed in claim 36, in which a net band, which has a first longitudinal web on its first longitudinal side and a second longitudinal web on its second longitudinal side, which webs are joined to each other by means of transverse webs, is used as the connecting band.

50. The process as claimed in claim 49, wherein a net band is used in which at least the second longitudinal web is constructed using elastically compliant material.

51. The process as claimed in claim 49, wherein a net band is used in which the transverse webs are constructed using non-elastic material.

52. The process as claimed in claim 36, in which a connecting band with an extendibility of at least 20% is used.

53. The process as claimed in claim 36, in which the lower end of the lining edge and the second longitudinal side of the connecting band are joined to a string-lasting tunnel, which receives a lashing string which is longitudinally movable in relation to the string-lasting tunnel, and, by lashing together of the lashing string, a lower upper end region with the lining edge and the connecting band is tautened in the inward direction in such a way that the lower upper end region with the lining edge and the connecting band extend in the direction of the extent of a sole still to be applied.

54. The process as claimed in claim 36, in which the functional layer of the lining material end region is sealed in a waterproof manner by a sealing material, at least in a sealing material zone that is located in the region of the connecting band and extends in the peripheral direction of the upper end region.

55. A process for producing footwear, in which an upper is produced by the process as claimed in claim 36 and the functional layer of the lining material end region is sealed in a waterproof manner by a sealing material, at least in a sealing material zone that is located in the region of the connecting band and extends in the peripheral direction of the upper end region.

56. The process as claimed in claim 55, in which there is molded onto the upper a sole made of sole material which is liquid during molding-on and, which by penetrating through the porous connecting band, seals in a waterproof manner at least part of the width of the lining edge that is not covered by upper outer material.

57. The process as claimed in claim 55, using a sealing material in the form of a sealing adhesive which leads to waterproofness in the cured state and, which by penetrating through the porous connecting band, seals in a waterproof manner at least part of the width of the lining edge that is not covered by upper outer material.

58. The process as claimed in claim 57, using a sealing material in the form of reactive hot-melt adhesive, which leads to waterproofness in the fully reacted state.

59. The process as claimed in claim 55, in which a lower upper end region having the lining edge and the connecting band is aligned in such a way that it extends in the direction of the extent of an outsole still to be applied, and the lower upper end region is joined to an insole.

60. The process as claimed in claim 59, in which the insole is joined to the lining edge and the second longitudinal side of the connecting band by means of a Strobel seam.

61. The process as claimed in claim 59, in which the lower upper end region is lasted by means of lasting cement onto a lower peripheral edge of the insole.

62. The process as claimed in claim 55, in which a sheet-like waterproof sealing layer, which seals a lower opening of the upper as far as the sealing material zone, is applied to the underside of the upper end region turned back in the direction of the extent of the sole.

63. The process as claimed in claim 62, in which a sealing sheet is cemented onto the underside of the insole as the sealing layer.

* * * * *